United States Patent
Hupka et al.

(10) Patent No.: US 9,062,149 B2
(45) Date of Patent: Jun. 23, 2015

(54) HIGH-VALUE POLYURETHANE ELASTOMERS AND PRODUCTION THEREOF

(75) Inventors: Florian Hupka, Duesseldorf (DE); Stephan Reiter, Langenfeld (DE); Hartmut Nefzger, Pulheim (DE); Jens Krause, Leverkusen (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 0 days.

(21) Appl. No.: 14/125,836

(22) PCT Filed: Jun. 26, 2012

(86) PCT No.: PCT/EP2012/062358
§ 371 (c)(1),
(2), (4) Date: Dec. 12, 2013

(87) PCT Pub. No.: WO2013/000912
PCT Pub. Date: Jan. 3, 2013

(65) Prior Publication Data
US 2014/0142243 A1    May 22, 2014

(30) Foreign Application Priority Data
Jun. 29, 2011 (DE) .......................... 10 2011 078 351

(51) Int. Cl.
| | |
|---|---|
| *C08G 18/10* | (2006.01) |
| *C08G 18/72* | (2006.01) |
| *C08G 18/78* | (2006.01) |
| *C08G 18/42* | (2006.01) |
| *C08G 18/71* | (2006.01) |
| *C08G 18/76* | (2006.01) |

(52) U.S. Cl.
CPC ............ *C08G 18/72* (2013.01); *C08G 18/7843* (2013.01); *C08G 18/10* (2013.01); *C08G 18/4238* (2013.01); *C08G 18/71* (2013.01); *C08G 18/7678* (2013.01)

(58) Field of Classification Search
CPC . C08G 18/71; C08G 18/7678; C08G 18/7843
USPC ...................................... 528/59, 65
See application file for complete search history.

(56) References Cited

U.S. PATENT DOCUMENTS

| | | | | |
|---|---|---|---|---|
| 4,334,033 | A * | 6/1982 | Metzinger et al. ............ | 521/159 |
| 6,961,185 | B2 * | 11/2005 | Suehiro et al. ............... | 359/620 |
| 2005/0148105 | A1 * | 7/2005 | Suehiro et al. ................. | 438/22 |
| 2006/0205911 | A1 | 9/2006 | Ludewig et al. | |
| 2007/0049720 | A1 | 3/2007 | Krause et al. | |
| 2008/0108776 | A1 * | 5/2008 | Barnes et al. .................. | 528/85 |
| 2008/0300377 | A1 * | 12/2008 | Nefzger et al. ................ | 528/65 |
| 2009/0127921 | A1 | 5/2009 | Krause | |

FOREIGN PATENT DOCUMENTS

| | | |
|---|---|---|
| DE | 1 694 169 | 6/1971 |
| EP | 1 997 841 | 5/2008 |
| WO | 2007/022884 | 3/2007 |

OTHER PUBLICATIONS

International Search Report for PCT/EP2012/062358 Mailed September 14, 2012.

\* cited by examiner

*Primary Examiner* — Michael L Leonard
(74) *Attorney, Agent, or Firm* — Miles and Stockbridge

(57) ABSTRACT

The present invention relates to high-value polyurethane (PUR) and polyurethaneurea elastomers, which can be processed in a particularly simple manner by use of low-viscosity prepolymers based on naphthalene 1,5-diisocyanate, and to a process for production thereof.

13 Claims, No Drawings

HIGH-VALUE POLYURETHANE ELASTOMERS AND PRODUCTION THEREOF

CROSS REFERENCE TO RELATED APPLICATIONS

This application is a §371 National Stage Application of PCT/EP2012/062358, filed Jun. 26, 2012, which claims priority to European Application No. 10 2011 078 351.2, filed Jun. 29, 2011.

BACKGROUND OF THE INVENTION

1. Field of the Invention

The present invention relates to high-value polyurethane (PU) elastomers and high-value polyurethane-urea elastomers which are particularly easy to process as a result of use of low-viscosity prepolymers based on naphthalene 1,5-diisocyante, and also to a process for production of these.

2. Description of Related Art

PU cast elastomers are valuable materials, and are produced from polyisocyanates, polyols, and chain extenders, and/or crosslinking agents. An industrially important polyisocyanate here is naphthalene 1,5-diisocyanate (NDI).

Polyols that can be used are the mostly hydroxy-group-terminated polyester or polyether polyols that are known to the person skilled in the art. Chain extenders used are short-chain polyols, e.g. ethylene glycol or butylene 1,4-glycol, and likewise short-chain polyamines, e.g. 4,4'-methylenebis(2-chloroaniline) (MBOCA), or else water.

Polyurethanes based on naphthalene 1,5-diisocyanate (e.g. Desmodur® 15 from Bayer MaterialScience AG) have been known for a long time, and are marketed by Bayer MaterialScience AG with trademark Vulkollan®, preferably in high-value applications. A feature of polyurethanes based on naphthalene 1,5-diisocyanate here is that they have not only excellent dynamic mechanical properties but also exceptional long-term usage performance in comparison with many other materials.

The use of NDI for the production of cast elastomers is likewise known, and is described by way of example in DE-A 1694169. Here, polyester polyols having softening points in the range from 60 to 145° C. are used.

In the production of PU cast elastomers, a distinction is made between the one-shot process in which the reactants polyisocyanate, polyol, and chain extender are reacted simultaneously with one another and the prepolymer process in which the polyol is reacted with the polyisocyanate and only then is the chain-extender component used.

Oligomers formed from NDI and from low-molecular-weight chain extender have poor solubility in the reacting melt made of NDI, chain extender, and polyol, and therefore precipitate and are unavailable for complete reaction and coupling to the polyol component, and for this reason elastomers based on NDI, in contrast to elastomers based on hexamethylene diisocyanate, toluene diisocyanate, or diphenylmethane 4,4'-diisocyanate, are produced only by the prepolymer process, and not by the one-shot process.

On the other hand, because of the comparatively high melting point of NDI, 127° C., it is necessary to produce the NCO prepolymers based on NDI at reaction temperatures above that temperature, in order to ensure that the reaction mixture is homogeneous. However, the NCO prepolymers based on NDI that are widely used for the production of NDI-based cast elastomers have only a short shelf life when exposed to high temperature ($\geq$127° C.), since the high temperatures cause side-reactions, the final result of which is a reduced NCO index, in conjunction with a viscosity rise, and processing therefore at least becomes more difficult, if not impossible.

The above problems with conventional NDI prepolymers having short shelf life form the background to recommended processing methods which require that the chain-extension reaction be carried out within 30 minutes after production of the NDI prepolymer, and to descriptions in the literature which cast doubt in very general terms on the storage capability of NDI prepolymers: in "Solid Polyurethane Elastomers", P. Wright and A. P. C. Cummings, Maclaren and Sons, London 1969, pp. 104 ff. in chapter 6.2. we find the following:

"6.2.1. Unstable Prepolymer Systems (Vulkollan®) (Vulkollan®; Trademark for Cast Elastomer Systems Based on Naphthalene Diisocyanate (NDI) from Bayer MaterialScience AG).

Vulkollan® is manufactured by a prepolymer route, although the prepolymer is non-storable and must be further reacted within a short interval of time. The prepolymer so formed is relatively unstable since further undesirable side reactions can take place. To reduce the possibility of these side reactions occurring, the next stage in the process, viz. the chain extension, should take place as soon as possible but within a maximum of 30 minutes."

These statements clarify the reason for the importance of low initial viscosity of the prepolymer, since even within the recommended 30 min the viscosity rises markedly, and therefore processing, in particular of relatively large and/or relatively complicated moldings, is made at least more difficult, if not impossible, since the reacting melt made of high-viscosity prepolymer and chain extender then fails by way of example to reach mold regions that are distant from the gate. A low initial viscosity of the NDI prepolymers is generally also desirable in order to ensure that it is easy to disperse the chain extender within the material. In particular NDI-based elastomers with high hardness values, based on prepolymer with high NCO content, where by way of example 1,4-butanediol is used as chain extender, also exhibit extremely low casting times, and again this makes it very difficult to produce complicated moldings.

WO 2007/022884 A1 describes 2,2'-thiodiethanol as chain extender permitting achievement of relatively long casting times for the reaction of PU-NCO prepolymers with crosslinking agents, where the mechanical properties of the resultant PU elastomers are no poorer than those of comparable prior-art elastomers. This longer casting time permits production of complicated moldings made of hard PU elastomers.

SUMMARY

The object of the present invention was therefore to lower the initial viscosity of the prepolymer in order to improve processability, without rendering the mechanical properties of the resultant PU elastomers poorer than those of comparable elastomers of the prior art, a factor requiring consideration being that additives that are used to reduce viscosity, e.g. castor oil derivatives, are often not stable at the high usage temperatures and/or cause severe impairment not only of the dynamic mechanical properties of the PU elastomers but also of their other mechanical properties.

Surprisingly, it has been found that small proportions of naphthyl 1-isocyanate in the naphthalene 1,5-diisocyanate markedly reduce viscosity. In this connection it is well known to the person skilled in the art that additions made in a controlled manner to a prepolymer can reduce viscosity, but it is also known to the person skilled in the art that at the same time the mechanical properties of the finished moldings are severely impaired. Surprisingly, it has been found that addition of from 0.05 to 0.7% by weight, based on polyol, of naphthyl 1-isocyanate to the NDI used markedly reduces the initial viscosity of the prepolymer and at the same time the dynamic mechanical properties of the elastomer, and its other mechanical properties, are adequately good. It is therefore possible to produce complicated components even with the short casting times that are typical of formulations for PU elastomers of high hardness.

The present invention therefore provides a process for the production of low-viscosity NCO prepolymers based on naphthalene 1,5-diisocyanate, which is characterized in that
a) naphthalene 1,5-diisocyanate (NDI) with which from 0.05 to 0.7% by weight, preferably from 0.05 to 0.5% by weight, based on component b), of naphthyl 1-isocyanate has been admixed is reacted continuously or batchwise with
b) polyols which have a temperature of from 80° C. to 240° C., number-average molar masses of from 850 to 3000 g/mol, preferably from 1000 to 3000 g/mol, viscosities of ≤2500 mPas, preferably from 500 to 2500 mPas, measured at 120° C., and functionalities of from 1.95 to 2.15, selected from the group consisting of polyester polyols, poly-ε-caprolactone polyols, polycarbonate polyols, polyether polyols, and α-hydro-ω-hydroxypoly(oxytetramethylene) polyols
in a ratio of NCO groups to OH groups of from 1.5:1 to 3.05:1, preferably from 1.6:1 to 2.95:1, particularly preferably from 1.7:1 to 2.85:1.

The present invention further provides a process for the production of polyurethane elastomers which is characterized in that the NCO prepolymers produced in the invention, based on naphthalene 1,5-diisocyanate, are reacted with
c) chain extenders which have hydroxy groups and having molecular weights of from 62 to 450 daltons, and functionalities of from 2 to 3, and/or water,
d) optionally in the presence of blowing agents, auxiliaries, and additives.

DETAILED DESCRIPTION OF A PREFERRED EMBODIMENT

The polyurethane elastomers produced in the invention comprise not only cellular but also solid PU elastomers.

The present invention further provides low-viscosity NCO prepolymers based on naphthalene 1,5-diisocyanate which are characterized in that they are obtainable from
a) naphthalene 1,5-diisocyanate (NDI) with which from 0.05 to 0.7% by weight, preferably from 0.05 to 0.5% by weight, based on component b), of naphthyl 1-isocyanate has been admixed and
b) polyols which have a temperature of from 80° C. to 240° C., number-average molar masses of from 850 to 3000 g/mol, preferably from 1000 to 3000 g/mol, viscosities of ≤2500 mPas, preferably from 500 to 2500 mPas, measured at 120° C., and functionalities of from 1.95 to 2.15, selected from the group consisting of polyester polyols, poly-ε-caprolactone polyols, polycarbonate polyols, polyether polyols, and α-hydro-ω-hydroxypoly(oxytetramethylene) polyols
in a ratio of NCO groups to OH groups of from 1.5:1 to 3.05:1, preferably from 1.6:1 to 2.95:1, particularly preferably from 1.7:1 to 2.85:1.

The present invention further provides polyurethane elastomers which are characterized in that they are obtainable from the NCO prepolymers of the invention based on naphthalene 1,5-diisocyanate and from
c) chain extenders which have hydroxy groups and having molecular weights of from 62 to 450 daltons, and functionalities of from 2 to 3, and/or water,
d) optionally in the presence of blowing agents, auxiliaries, and additives.

The polyurethane elastomers of the invention can be used as damping elements in vehicle construction, for example in automobile construction, e.g. as overload springs, buffers, transverse link bearings, rear axle subframe bearings, stabilizer bearings, longitudinal strut bearings, suspension strut bearings, shock absorber bearings, or bearings for wishbones, and also as an emergency wheel located on the rim, and as coating for rollers, wheels, and rolls.

The examples hereinafter are intended to provide further explanation of the invention.

Starting Compounds and Test Equipment Used:
Desmodur® 15 from Bayer MaterialScience AG: naphthalene 1,5-diisocyanate
Vulkollan® 2000 MM from Bayer MaterialScience AG: polyethylene adipate, OH number (OHN) 55, functionality 2
Naphthyl 1-isocyanate from Acros Organics
Butanediol: 1,4-butanediol from Aldrich
Viscometer: Physica MCR 51 from Anton Paar

Example 1

Production of NDI Elastomers of Low Hardness with Addition of Different Amounts of Naphthyl 1-Isocyanate A-1C is a comparative example, but A-2, A-3, and A-4 are inventive examples.

100 parts by weight of Vulkollan® 2000 MM were heated to 110° C. and degassed. The temperature was increased to 133° C. 18 parts by weight of Desmodur® 15 with which 0 (A-1C), 0.1 (A-2), 0.3 (A-3), or 0.5 (A-4) part by weight of naphthyl 1-isocyanate was admixed in advance, were added, with stirring. Vacuum was then applied. After 5 minutes, the viscosity of the resultant prepolymer was measured (see table 1). After 15 minutes of reaction time, the exothermic activity of the reaction had subsided, and the temperature of the prepolymer melt was 125° C. 2 parts by weight of 1,4-butanediol were mixed with the product, and the reaction mixture, the viscosity of which was still low, was cast into molds that had been preheated to 110° C., demolded after 30 minutes, and then conditioned at 110° C. for 16 hours in a convection oven. Dynamic mechanical properties and other mechanical properties were determined (see table 2).

TABLE 1

Formulations for the elastomers produced and viscosities of the prepolymers produced with different contents of naphthyl 1-isocyanate

| Elastomer | | A-1C | A-2 | A-3 | A-4 |
|---|---|---|---|---|---|
| Formulation for prepolymer: | | | | | |
| Vulkollan ® 2000 MM | [pts. by wt.] | 100 | 100 | 100 | 100 |
| Naphthalene 1,5-diisocyanate | [pts. by wt.] | 18 | 17.9 | 17.7 | 17.5 |
| Naphthyl 1-isocyanate | [pts. by wt.] | 0.0 | 0.1 | 0.3 | 0.5 |
| Chain extender: | | | | | |
| 1,4-Butanediol | [pts. by wt.] | 2.0 | 2.0 | 2.0 | 2.0 |
| Indices for the reaction: | | | | | |
| Overall index | | 120.4 | 120.1 | 119.6 | 119.1 |
| OH number of polyol | [mgKOH/g] | 55 | 55 | 55 | 55 |
| Prepolymer temperature | [° C.] | 130 | 126 | 131 | 127 |
| Casting time | [s] | 150 | 150 | 150 | 150 |
| Mold temperature | [s] | 110 | 110 | 110 | 110 |
| Demolding after | [min] | 30 | 30 | 30 | 30 |
| Viscosity of prepolymer | [mPas] | 2390 | 2270 | 2080 | 1940 |

TABLE 2

Dynamic mechanical properties and other mechanical properties of the unfoamed elastomers

| | Elastomer | | B-1C | B-2 | B-3 | B-4 |
|---|---|---|---|---|---|---|
| Mechanical properties: | | | | | | |
| DIN 53505 | Shore A hardness | [Shore A] | 86 | 85 | 85 | 84 |
| DIN 53505 | Shore D hardness | [Shore D] | 33 | 33 | 33 | 31 |
| DIN 53504 | Tensile stress, 100% | [MPa] | 4.6 | 4.5 | 4.5 | 4.1 |
| DIN 53504 | Tensile stress, 300% | [MPa] | 10.9 | 9.7 | 9.3 | 8.5 |
| DIN 53504 | Tensile stress at break | [MPa] | 50.3 | 43.5 | 40.3 | 39.8 |
| DIN 53504 | Elongation at break | [%] | 640 | 679 | 615 | 737 |
| DIN 53515 | Tear-propagation resistance (Graves) | [kN/m] | 37 | 38 | 49 | 49 |
| DIN 53512 | Rebound resilience | [%] | 49 | 51 | 49 | 50 |
| DIN 53516 | Abrasion | [mm$^3$] | 40 | 42 | 59 | 48 |
| DIN 53520 | Density | [g/mm$^3$] | 1.248 | 1.249 | 1.249 | 1.246 |
| Dynamic mechanical properties: | | | | | | |
| DIN EN ISO 6721-2 | Storage modulus, G' at −15° C. | [MPa] | 22 | 23 | 25 | 23 |
| DIN EN ISO 6721-2 | Storage modulus, G' at 50° C. | [MPa] | 17 | 16 | 18 | 16 |
| DIN EN ISO 6721-2 | Storage modulus, G' at 110° C. | [MPa] | 17 | 16 | 17 | 16 |
| | Quotient $\frac{G' \text{ at } -15°\text{ C.}}{G' \text{ at } 110°\text{ C.}}$ | | 1.35 | 1.47 | 1.45 | 1.40 |
| DIN EN ISO 6721-2 | Loss factor tan δ at −15° C. | | 0.26 | 0.31 | 0.27 | 0.26 |
| DIN EN ISO 6721-2 | Loss factor tan δ at 50° C. | | 0.02 | 0.03 | 0.02 | 0.03 |
| DIN EN ISO 6721-2 | Loss factor tan δ at 110° C. | | 0.02 | 0.03 | 0.03 | 0.03 |
| | tan δ min. | [° C.] | 90 | 40 | 45 | 85 |
| | tan δ max. | [° C.] | −25 | −20 | −21 | −20 |

Example 2

Production of NDI Elastomers of High Hardness with Addition of Different Amounts of Naphthyl 1-Isocyanate A-5C is a comparative example, but A-6, A-7, and A-8 are inventive examples.

100 parts by weight of Vulkollan® 2000 MM were heated to 110° C. and degassed. The temperature was increased to 133° C. 25 parts by weight of Desmodur® 15 with which 0 (A-5C), 0.1 (A-6), 0.3 (A-7), or 0.5 (A-8) part by weight of naphthyl 1-isocyanate was admixed in advance, were added, with stirring. Vacuum was then applied. After 5 minutes, the viscosity of the resultant prepolymer was measured (see table 3). After 15 minutes of reaction time, the exothermic activity of the reaction had subsided, and the temperature of the prepolymer melt was 125° C. 5 parts by weight of 1,4-butanediol were mixed with the product, and the reaction mixture, the viscosity of which was still low, was cast into molds that had been preheated to 110° C., demolded after 30 minutes, and then conditioned at 110° C. for 16 hours in a convection oven. Dynamic mechanical properties and other mechanical properties were determined (see table 4).

TABLE 3

Formulations for the elastomers produced and viscosities of the prepolymers produced with different contents of naphthyl 1-isocyanate

| Elastomer | | A-5C | A-6 | A-7 | A-8 |
|---|---|---|---|---|---|
| Formulation for prepolymer: | | | | | |
| Vulkollan ® 2000 MM | [pts. by wt.] | 100 | 100 | 100 | 100 |
| Naphthalene 1,5-diisocyanate | [pts. by wt.] | 25 | 24.9 | 24.7 | 24.5 |
| Naphthyl 1-isocyanate | [pts. by wt.] | 0.0 | 0.1 | 0.3 | 0.5 |
| Chain extender: | | | | | |
| 1,4-Butanediol | [pts. by wt.] | 5 | 5 | 5 | 5 |
| Indices for the reaction: | | | | | |
| Overall index | | 113.9 | 113.7 | 113.4 | 113.1 |
| OH number of polyol | [mgKOH/g] | 55 | 55 | 55 | 55 |
| Prepolymer temperature | [° C.] | 128 | 129 | 128 | 127 |
| Casting time | [s] | 100 | 100 | 100 | 100 |
| Mold temperature | [s] | 110 | 110 | 110 | 110 |
| Demolding after | [min] | 30 | 30 | 30 | 30 |
| Viscosity of prepolymer | [mPas] | 1050 | 1030 | 880 | 840 |

TABLE 4

Dynamic mechanical properties and other mechanical properties of the unfoamed elastomers

| | Elastomer | | B-5C | B-6 | B-7 | B-8 |
|---|---|---|---|---|---|---|
| Mechanical properties: | | | | | | |
| DIN 53505 | Shore A hardness | [Shore A] | 95 | 94 | 93 | 93 |
| DIN 53505 | Shore D hardness | [Shore D] | 37 | 37 | 35 | 34 |
| DIN 53504 | Tensile stress, 100% | [MPa] | 7.7 | 7.6 | 7.6 | 7.3 |
| DIN 53504 | Tensile stress, 300% | [MPa] | 14.4 | 14.4 | 14.3 | 13.1 |
| DIN 53504 | Tensile stress at break | [MPa] | 33.2 | 28.6 | 31.2 | 25.5 |
| DIN 53504 | Elongation at break | [%] | 687 | 627 | 689 | 637 |

TABLE 4-continued

Dynamic mechanical properties and other mechanical properties of the unfoamed elastomers

| | Elastomer | | B-5C | B-6 | B-7 | B-8 |
|---|---|---|---|---|---|---|
| DIN 53515 | Tear-propagation resistance (Graves) | [kN/m] | 72 | 68 | 66 | 61 |
| DIN 53512 | Rebound resilience | [%] | 59 | 57 | 56 | 56 |
| DIN 53516 | Abrasion | [mm$^3$] | 63 | 68 | 52 | 59 |
| DIN 53520 | Density | [g/mm$^3$] | 1.256 | 1.255 | 1.256 | 1.254 |
| Dynamic mechanical properties: | | | | | | |
| DIN EN ISO 6721-2 | Storage modulus, G' at −15° C. | [MPa] | 49 | 52 | 50 | 53 |
| DIN EN ISO 6721-2 | Storage modulus, G' at 50° C. | [MPa] | 33 | 34 | 32 | 32 |
| DIN EN ISO 6721-2 | Storage modulus, G' at 110° C. | [MPa] | 30 | 33 | 31 | 29 |
| | Quotient $\frac{G' \text{ at } -15° C.}{G' \text{ at } 110° C.}$ | | 1.63 | 1.59 | 1.62 | 1.82 |
| DIN EN ISO 6721-2 | Loss factor tan δ at −15° C. | | 0.21 | 0.21 | 0.19 | 0.21 |
| DIN EN ISO 6721-2 | Loss factor tan δ at 50° C. | | 0.03 | 0.03 | 0.03 | 0.04 |
| DIN EN ISO 6721-2 | Loss factor tan δ at 110° C. | | 0.02 | 0.02 | 0.03 | 0.04 |
| | tan δ min. | [° C.] | 120 | 110 | 100 | 100 |
| | tan δ max. | [° C.] | −21 | −20 | −25 | −20 |

Tables 1 and 3 show that the viscosities of the prepolymers of the invention are considerably lower than the viscosities of the comparative prepolymers. From tables 2 and 4 it is clear that, despite addition of naphthyl 1-isocyanate, the dynamic mechanical properties and other mechanical properties of the elastomers of the invention are similar to the properties of the comparative examples.

What is claimed is:

1. A process for producing a low-viscosity NCO prepolymer based on naphthalene 1,5-diisocyanate, comprising:
   a) reacting naphthalene 1,5-diisocyanate (NDI) with which from 0.05 to 0.7% by weight, based on component b), of naphthyl 1-isocyanate has been admixed continuously or batchwise with
   b) at least one polyol which has a number-average molar mass of from 850 to 3000 g/mol, viscosity of ≤2500 mPas measured at 120° C., and functionality of from 1.95 to 2.15, selected from the group consisting of polyester polyols, poly-ε-caprolactone polyols, polycarbonate polyols, polyether polyols, and α-hydro-ω-hydroxy-poly(oxytetramethylene) polyols, wherein the polyol is at a temperature of from 80° C. to 240° C.
   in a ratio of NCO groups to OH groups of from 1.5:1 to 3.05:1.

2. A process for producing a polyurethane elastomer, wherein the NCO prepolymer produced by the process as claimed in claim 1, based on naphthalene 1,5-diisocyanate, is reacted with
   c) a chain extender which has hydroxy groups, a molecular weight of from 62 to 450 daltons, and a functionality of from 2 to 3, and/or water,
   d) optionally in the presence of a blowing agent, an auxiliary, and/or an additive.

3. A low-viscosity NCO prepolymer based on naphthalene 1,5-diisocyanate obtained from
   a) naphthalene 1,5-diisocyanate (NDI) with which from 0.05 to 0.7% by weight, based on component b), of naphthyl 1-isocyanate has been admixed and
   b) at least one polyol which has a number-average molar mass of from 850 to 3000 g/mol, viscosity of ≤2500 mPas measured at 120° C., and functionality of from 1.95 to 2.15, selected from the group consisting of polyester polyols, poly-ε-caprolactone polyols, polycarbonate polyols, polyether polyols, and α-hydro-ω-hydroxy-poly(oxytetramethylene) polyols
   in a ratio of NCO groups to OH groups of from 1.5:1 to 3.05:1.

4. A polyurethane elastomer obtained from an NCO prepolymer based on naphthalene 1,5-diisocyanate as claimed in claim 3 and from
   c) a chain extender which has hydroxy groups, a molecular weight of from 62 to 450 daltons, and a functionality of from 2 to 3, and/or water,
   d) optionally in the presence of a blowing agent, an auxiliary, and/or an additive.

5. A damping element in vehicle construction, an emergency wheel located on a wheel rim, or a coating for a roller, wheel, or roll comprising the polyurethane elastomer as claimed in claim 4.

6. A process as claimed in claim 1, wherein the polyol has a number-average molar mass of from 1000 to 3000 g/mol.

7. A process as claimed in claim 1, wherein the polyol is a polyethylene adipate having an OH number of 55 and a functionality of 2.

8. A process as claimed in claim 1, wherein the ratio of NCO groups to OH groups is from 1.7:1 to 2.85:1.

9. A process as claimed in claim 2, wherein the chain extender is 1,4-butanediol.

10. An NCO prepolymer as claimed in claim 3 obtained from a polyol which has a number-average molar mass of from 1000 to 3000 g/mol.

11. An NCO prepolymer as claimed in claim 3 obtained from a polyol which is a polyethylene adipate having an OH number of 55 and a functionality of 2.

12. A polyurethane elastomer obtained from an NCO prepolymer as claimed in claim 10 and from
   c) a chain extender which has hydroxy groups, a molecular weight of from 62 to 450 daltons, and a functionality of from 2 to 3, and/or water,
   d) optionally in the presence of a blowing agent, an auxiliary, and/or an additive.

13. A polyurethane elastomer obtained from an NCO prepolymer as claimed in claim 11 and from
   c) a chain extender that is 1,4-butanediol and/or water,
   d) optionally in the presence of a blowing agent, an auxiliary, and/or an additive.

* * * * *